(12) United States Patent
Fukuda

(10) Patent No.: US 6,659,895 B2
(45) Date of Patent: Dec. 9, 2003

(54) MOTION SENSOR FOR USE WITH A BICYCLE SPROCKET ASSEMBLY

(75) Inventor: Masahiko Fukuda, Amagasaki (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 09/813,060

(22) Filed: Mar. 19, 2001

(65) Prior Publication Data

US 2001/0011809 A1 Aug. 9, 2001

Related U.S. Application Data

(62) Division of application No. 09/216,088, filed on Dec. 18, 1998.

(51) Int. Cl.$^7$ .......................... F16H 61/00; F16H 55/12; G01P 3/42
(52) U.S. Cl. .......................... 474/70; 474/78; 474/160; 474/80; 73/519.01; 324/168; 324/174
(58) Field of Search .................. 474/70, 77, 50, 474/82, 80, 28, 81, 102, 160; 280/261, 220, 207, 206, 259, 256; 310/165, 181; 324/173, 174, 168, 207.15, 207.25, 207.12; 137/807; 251/129.01, 909, 827; 73/514.39, 514.38, 514.4, 519.01

(56) References Cited

U.S. PATENT DOCUMENTS

| | | | | |
|---|---|---|---|---|
| 3,535,950 A | | 10/1970 | Shimano | 74/473 |
| 3,898,563 A | * | 8/1975 | Erisman | 324/166 |
| 4,308,665 A | | 1/1982 | Losch | 33/141 E |
| 4,331,918 A | | 5/1982 | Dunch | 342/174 |
| 4,430,800 A | | 2/1984 | Shimano | 33/141 E |
| 4,434,801 A | * | 3/1984 | Jiminez et al. | 600/502 |
| 4,490,127 A | | 12/1984 | Matsumoto et al. | 474/110 |
| 4,541,500 A | * | 9/1985 | Gelhard | 180/205 |
| 4,636,769 A | | 1/1987 | Tsuyama | 340/134 |
| 4,645,213 A | | 2/1987 | Washimi et al. | 277/53 |
| 4,901,562 A | | 2/1990 | Beakas et al. | 73/118.1 |
| 4,966,380 A | | 10/1990 | Mercat | 280/259 |
| 5,065,633 A | | 11/1991 | Mercat | 73/862.34 |
| 5,223,760 A | | 6/1993 | Peck et al. | 310/168 |
| 5,254,044 A | | 10/1993 | Anderson | |
| 5,336,995 A | | 8/1994 | Caron | 324/174 |
| 5,470,277 A | | 11/1995 | Romano | |
| 5,480,356 A | | 1/1996 | Campagnolo | |
| 5,526,997 A | * | 6/1996 | Karczmer | 474/160 X |
| 5,545,096 A | * | 8/1996 | Su | 474/160 |
| 5,560,266 A | | 10/1996 | Shikimori et al. | 74/594.1 |
| 5,876,159 A | | 3/1999 | Tseng et al. | 409/51 |
| 5,900,703 A | * | 5/1999 | Li | 318/2 |
| 6,045,472 A | | 4/2000 | Sung et al. | 474/160 |
| 6,102,821 A | | 8/2000 | Nakamura | 474/160 |
| 6,139,456 A | * | 10/2000 | Lii et al. | 474/160 X |
| 6,158,470 A | | 12/2000 | Ivers et al. | 137/807 |

FOREIGN PATENT DOCUMENTS

| | | |
|---|---|---|
| DE | 4340471 C1 | 2/1995 |
| EP | 773157 | 5/1997 |
| FR | 2413731 | 7/1979 |
| JP | 57-93861 | 11/1982 |
| JP | 8-104282 A | 4/1996 |
| JP | 8-271358 | 10/1996 |
| JP | 2000-08-301175 A * | 11/1996 |
| JP | 2000-185682 A | 7/2000 |
| JP | 2000-193540 A * | 7/2000 |
| WO | WO 95/26900 A1 | 10/1995 |

* cited by examiner

*Primary Examiner*—Marcus Charles
(74) *Attorney, Agent, or Firm*—James A. Deland

(57) ABSTRACT

A sensor retainer for a bicycle sprocket assembly includes an annular member for mounting and rotating coaxially with the bicycle sprocket assembly and a sensor element fixed to the annular member. Alternatively, the sensor retainer may include a fixing member for mounting a derailleur or other transmission to a bicycle frame and a sensor element mounted to the fixing member.

41 Claims, 13 Drawing Sheets

MOTION SENSOR FOR USE WITH A BICYCLE SPROCKET ASSEMBLY

CROSS REFERENCE TO RELATED APPLICATIONS

This application is a division of copending application Ser. No. 09/216,088, filed Dec. 18, 1998.

BACKGROUND OF THE INVENTION

The present invention is directed to electrical shift control devices for bicycle transmissions and, more particularly, to a motion sensor for use with a bicycle sprocket assembly.

Motion sensors are commonly used with bicycles to sense rotation of the wheel or pedal crank so that bicycle speed and cadence may be computed by a bicycle computer and displayed to the rider. Such information also may be used to control an automatic or semiautomatic bicycle transmission, wherein the bicycle speed or cadence may be used to determine when to change gear ratios. The typical motion sensor usually comprises a magnet attached to the wheel or crank arm and a magnetic sensor attached to the bicycle frame. When the magnet passes in close proximity to the magnetic sensor, the sensor provides a pulse to the bicycle computer. The speed or cadence then may be computed based on the elapsed time between successive pulses.

A disadvantage of traditional motion sensors is that they increase the number of parts at various locations on the bicycle, thus giving the bicycle a cluttered appearance. Furthermore, the appearance of a magnet rotating with the spokes can be disconcerting. Also, as the number of electronically controlled components increases, the amount of wiring needed to connect the various components together also increases. For example, if the bicycle uses an electronically controlled transmission, then wires must be routed for the wheel magnetic sensor, the crank magnetic sensor, the front transmission and the rear transmission. The aesthetic appearance of the bicycle is greatly diminished by such excessive wiring.

SUMMARY OF THE INVENTION

The present invention is directed to a motion sensor for use with a bicycle sprocket assembly wherein a magnet or first sensor element is mounted for rotation with the sprocket assembly. Another feature of the present invention is a magnetic sensor or second sensor element being mounted in close proximity to the bicycle transmission. Associating the first sensor element with the sprocket assembly eliminates the requirement of mounting the first sensor element on the spokes, and mounting the second sensor element in close proximity to the bicycle transmission allows the wiring for the second sensor element, if any, to be combined with any wiring or cables already routed to the transmission. The present invention thus combines various structures and functions in proximity to each other and results in a less cluttered appearance for the bicycle.

In one embodiment of the present invention, a sensor retainer for a bicycle sprocket assembly includes an annular member for mounting and rotating coaxially with the bicycle sprocket assembly and a sensor element fixed to the annular member. Alternatively, the sensor retainer may include a fixing member for mounting a derailleur or other transmission to a bicycle frame and a sensor element mounted to the fixing member.

In a more specific embodiment, a sensor assembly for a bicycle includes a plurality of sprockets mounted together for rotation around a common axis; a first sensor element coupled for rotation with the plurality of sprockets; and a second sensor element for attachment in close proximity to the plurality of sprockets so that the first sensor element rotates relative to the second sensor element. If desired, the first sensor element may include a signal generating element such as a magnet, and the second sensor element may include a signal receiving element such as a magnetic sensor. The second sensor element may include a first sensor unit for communicating with the first sensor element and a second sensor unit for communicating with the first sensor element, wherein the first sensor unit is offset from the second sensor unit in a circumferential direction. Such a structure allows the direction of rotation as well as the speed of rotation of the plurality of sprockets to be determined.

In another embodiment of the present invention, the plurality of sprockets may include a first sprocket and a second sprocket, wherein the first sprocket includes a shift facilitating structure for facilitating shifting of a chain from the second sprocket to the first sprocket. In this embodiment the first sensor element may be located at a specified rotational position relative to the shift facilitating structure so that the position of the shift facilitating structure may be determined. This feature has special usefulness when the sensor assembly is used in conjunction with an electronically controlled derailleur because then the derailleur may be commanded to shift the chain from the second sprocket to the first sprocket when the shift facilitating structure is in the optimum rotational position.

DETAILED DESCRIPTION OF THE EMBODIMENTS

Figure 1:
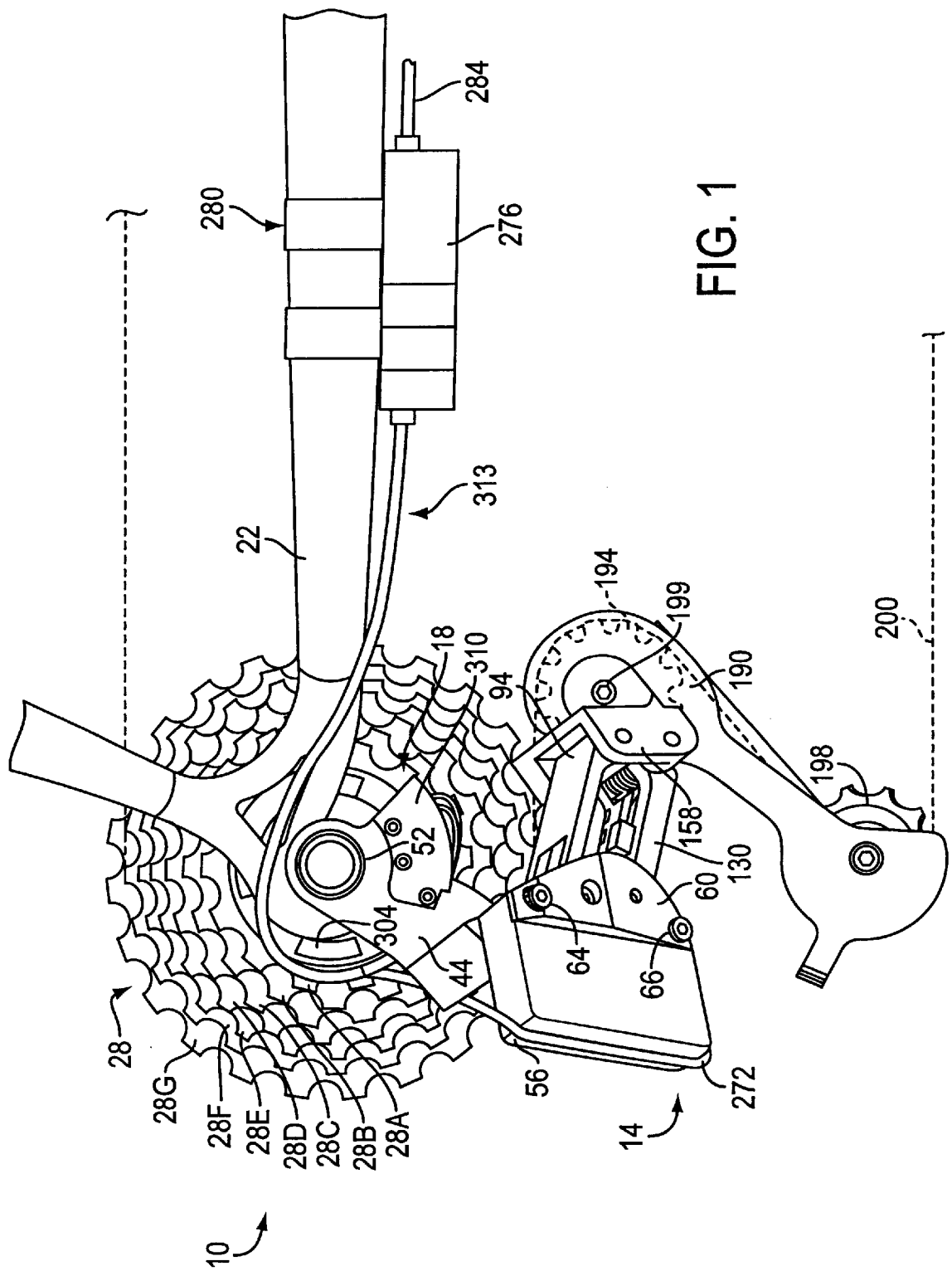
FIG. 1 is a side view of a rear portion of a bicycle that uses a particular embodiment of a bicycle transmission including a motor driven derailleur and motion sensor according to the present invention.
Figure 2:
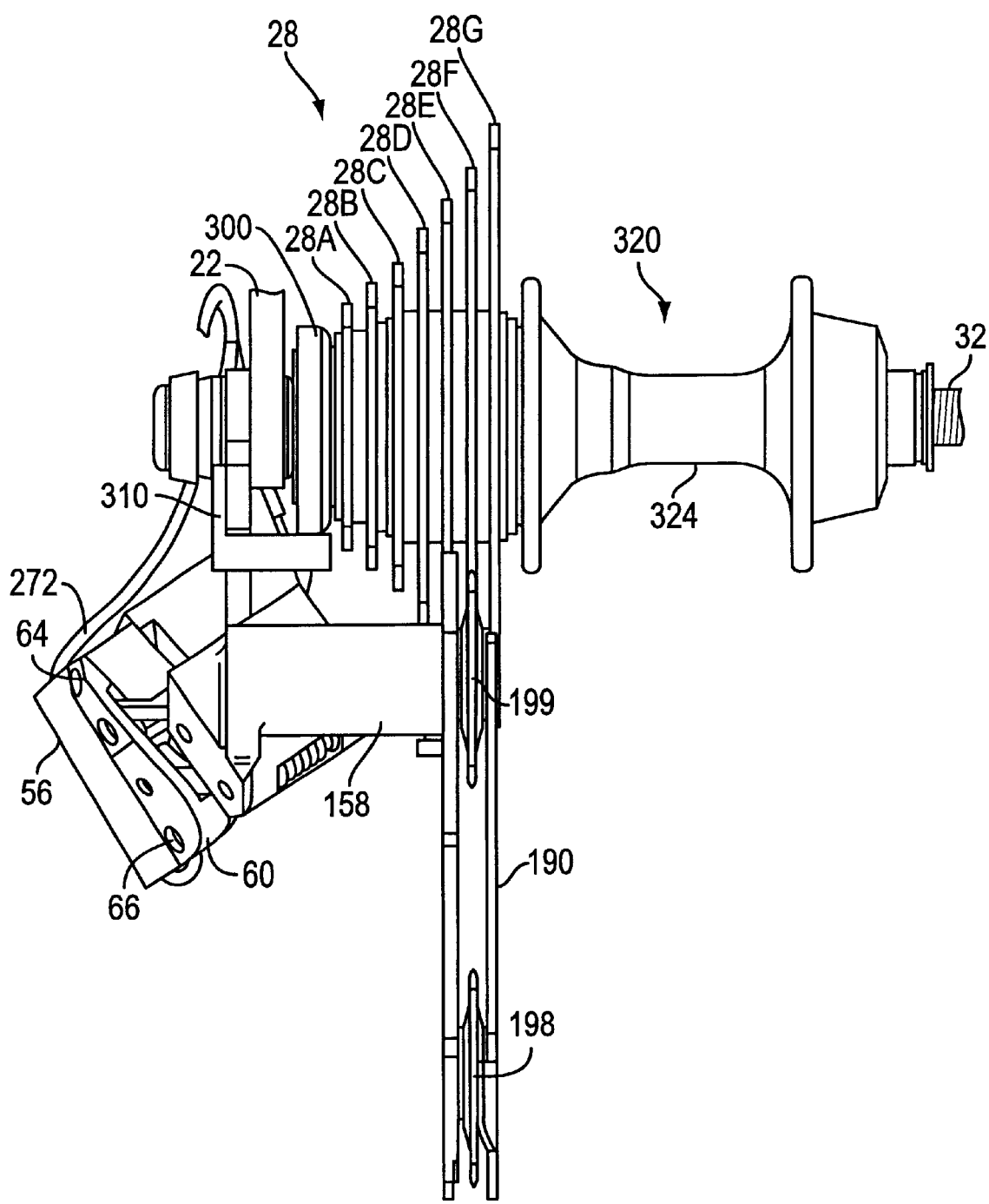
FIG. 2 is a front view the bicycle transmission shown in FIG. 1.
Figure 3:
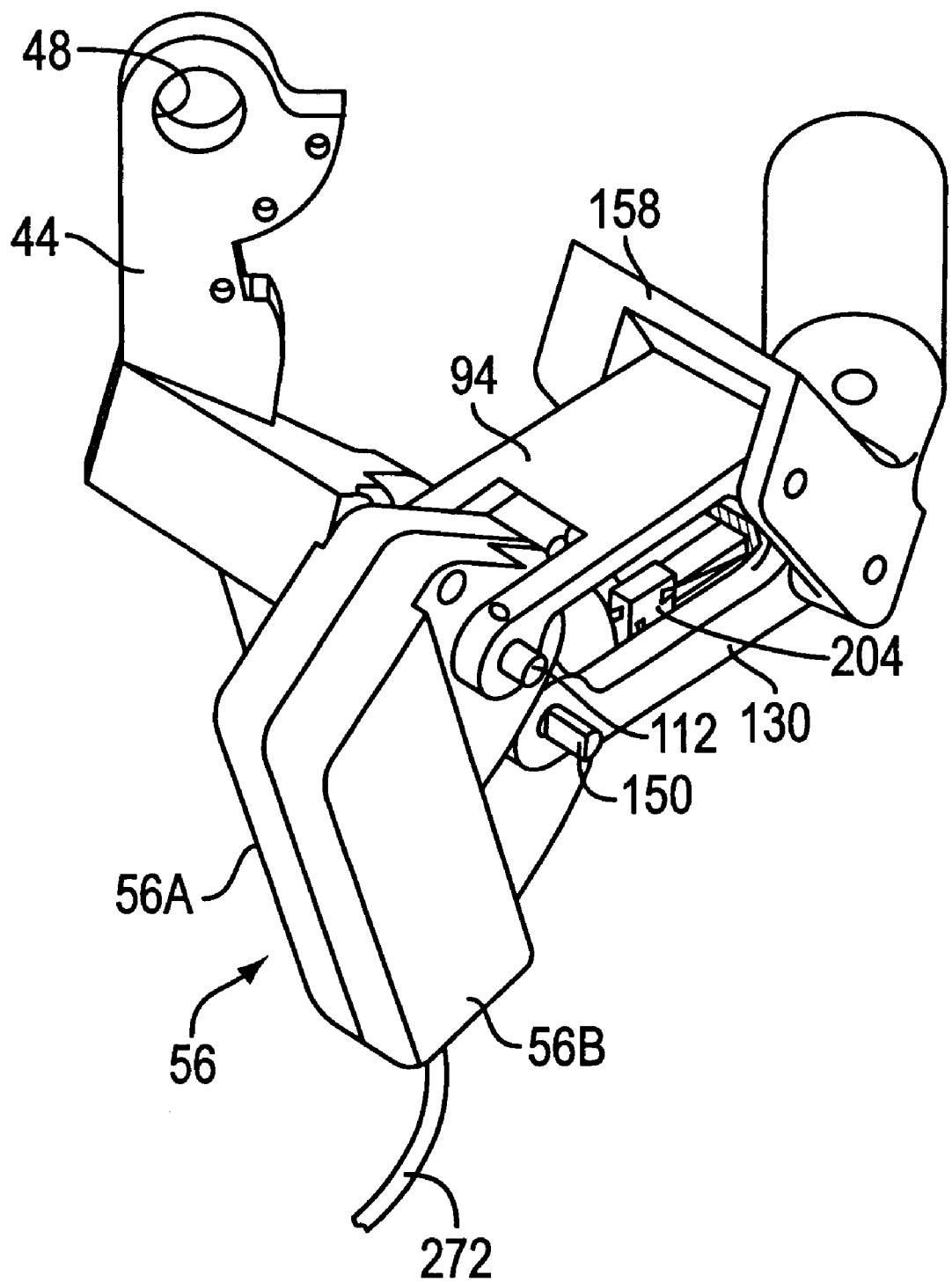
FIG. 3 is an oblique view of a portion of the motor driven derailleur shown in FIG. 1.

FIG. 1 is a side view of a rear portion of a bicycle that uses a particular embodiment of a bicycle transmission 10 according to the present invention including a motor driven derailleur 14 and a motion sensor 18 mounted to a bicycle frame 22. More specifically, a sprocket assembly 28 comprising plurality of sprockets 28(A–G) are coaxially and rotatably mounted around an axle 32 (FIG. 7) forming part of a freehub-style wheel hub 320. As shown in FIGS. 1–6, derailleur 14 includes a base member 44 with an axle opening 48 so that derailleur 14 may be mounted to frame 22 by passing axle 32 through axle opening 48 and screwing a nut 52 onto axle 32. A motor unit housing 56 and motor unit cover 60 are formed as part of the base member 44 by inserting screws 64 and 66 through respective openings 70 and 74 in motor unit cover 60, through respective openings 78 and 82 in motor unit housing 56, and into threaded openings 86 and 90 in base member 44.

Figure 4:
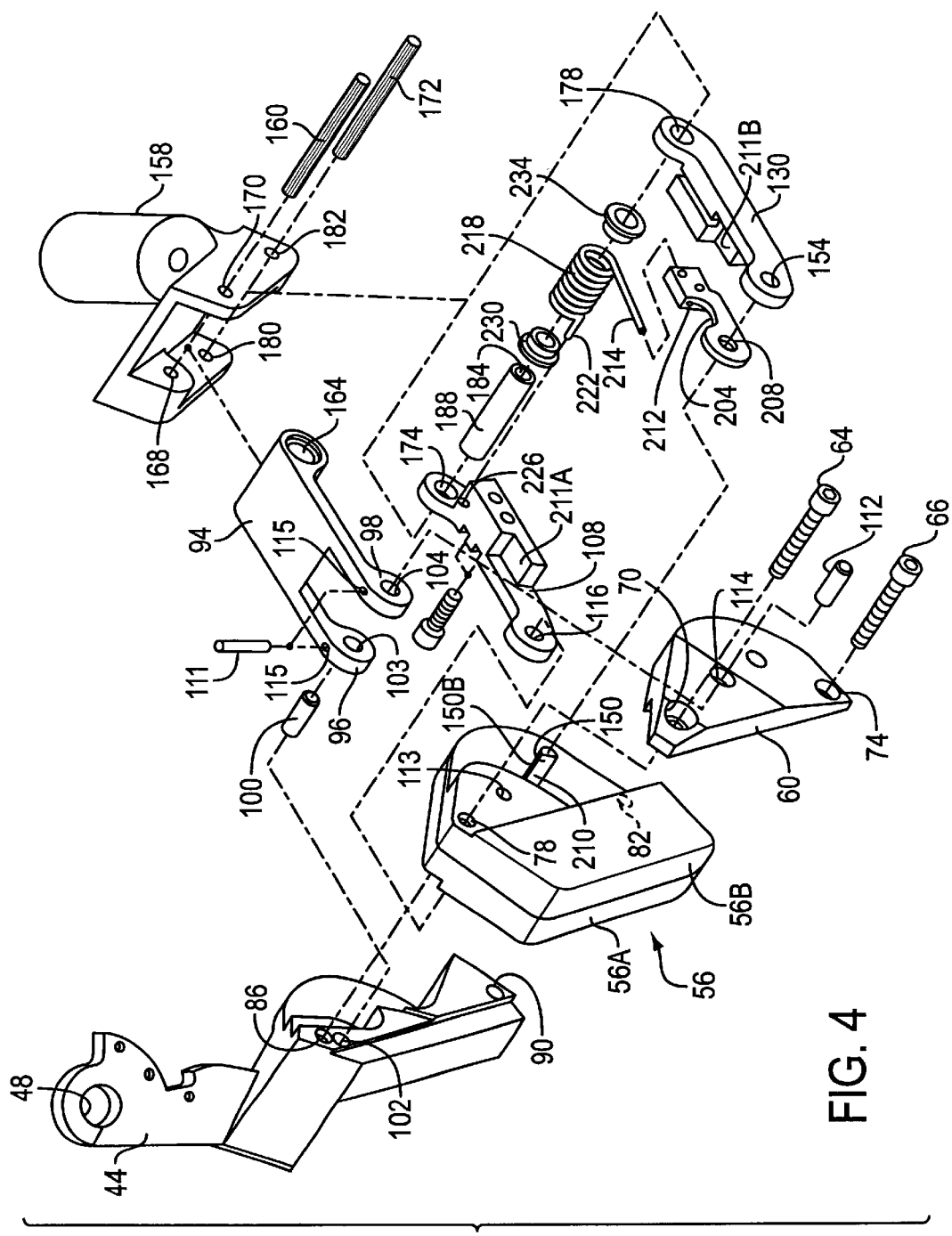
FIG. 4 is an exploded view of the portion of the motor driven derailleur shown in FIG. 3.

A link member 94 having prongs 96 and 98 is pivotably coupled to base member 44 and motor unit 56 by a pivot shaft 100 that extends through an opening 102 in base member and through an opening 103 in prong 96, and by a pivot shaft 112 that extends through an opening 113 in motor unit housing 56 and through an opening 104 in prong 98. Thus, prong 96 is disposed between base member 44 and motor unit housing 56, and prong 98 is disposed between motor unit housing 56 and motor unit cover 60. Fixing bolts 111 (only one is shown in FIG. 4) extend into openings 115 in prongs 96 and 98 to fix pivots shafts 100 and 112 in place. A link member 108 is pivotably coupled to motor unit housing 56 by a shaft section 150A (FIG. 6) of a pivot shaft 150 that passes through an opening 116 in link member 108, and a link member 130 is pivotably coupled to motor unit housing 56 by a shaft section 150B of pivot shaft 150 that passes through an opening 154 in link member 130. As discussed in more detail below, pivot shaft 150 also functions as an actuator shaft for moving the derailleur. The other end of link member 94 is pivotably connected to a movable member 158 by a pivot shaft 160 that extends through an opening 164 in link member 94 and through openings 168 and 170 in movable member 158. Similarly, the other ends of link members 108 and 130 are pivotably connected to movable member 158 by a pivot pin 172 that passes through an opening 174 in link member 108, through an opening 178 in link member 130, and through openings 180 and 182 in movable member 158. Pivot pin 172 also extends through an opening 184 in a spacer 188 disposed between link members 108 and 130. Thus, motor unit housing 56, link members 94, 108 and 130, and movable member 158 form a "four-bar" type linkage mechanism (wherein link members 108 and 130 function as one "bar") so that movable member 158 moves relative to base member 44 and motor unit housing 56. A chain guide 190 having a guide pulley 194 and a tension pulley 198 is pivotably mounted to movable member 158 through a pivot shaft 199 in a known manner for switching a chain 200 among the plurality of sprockets 28(A–G).

An actuating member in the form of an actuating arm 204 is nonrotatably mounted to pivot shaft 150 by keying an opening 208 on one end of actuating arm 204 to a flat 210 on pivot shaft 150. The other end of actuating arm 204 normally rests on abutments 211A and 211B formed on link members 108 and 130, and it has an opening or groove 212 for receiving a first end 214 of a coil spring 218 that is coiled around spacer 188. A second end 222 of spring 218 is inserted into an opening 226 in link member 108. Bushings 230 and 234 are disposed between spring 218 and link members 108 and 130, respectively, for minimizing friction between spring 218 and link members 108 and 130.

Figure 5:
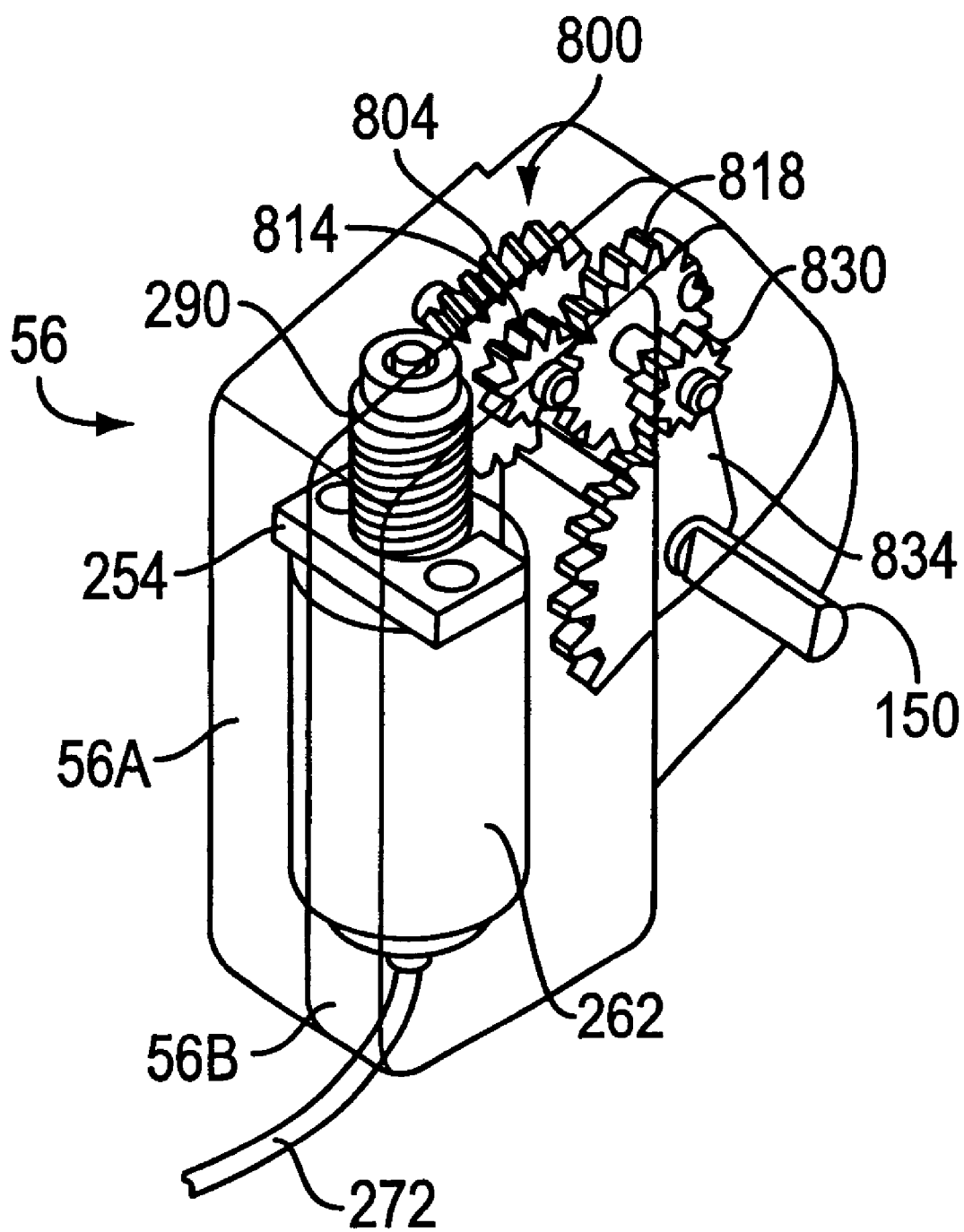
FIG. 5 is a view of the motor unit for the derailleur shown in FIG. 3 illustrating a particular embodiment of a gear reduction unit according to the present invention.
Figure 6:
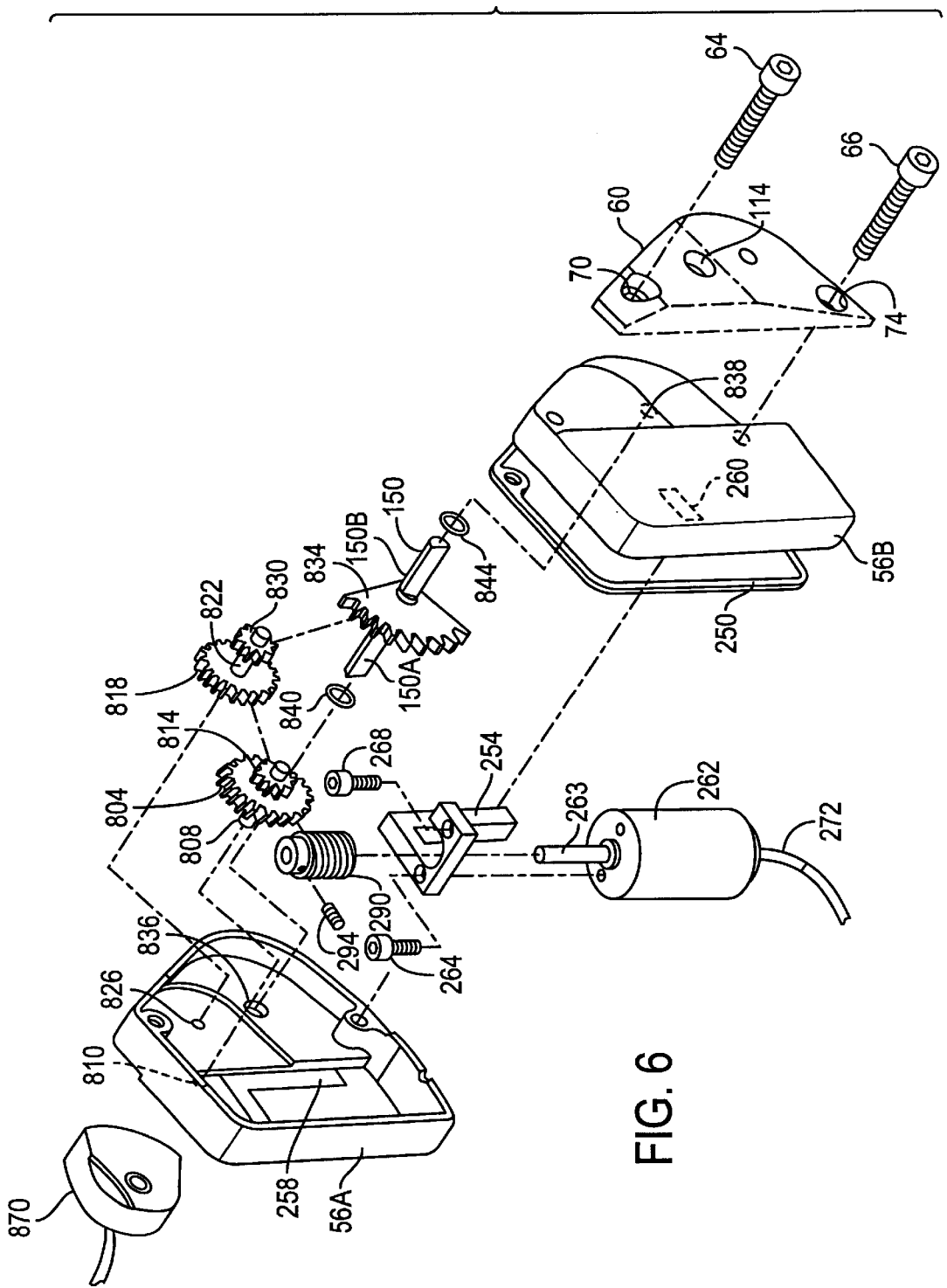
FIG. 6 is an exploded view of the motor unit shown in FIGS. 3–5.
Figure 7:
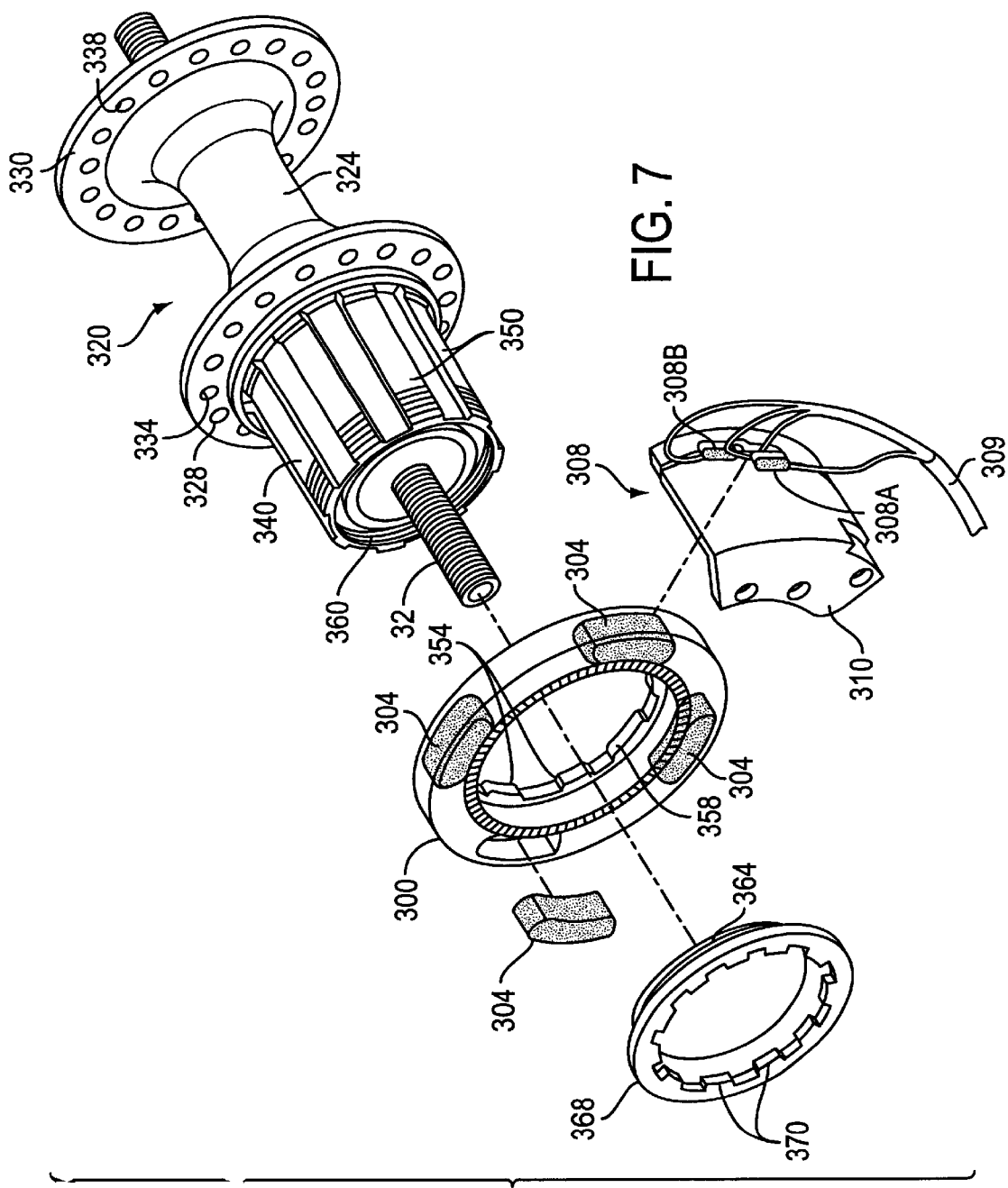
FIG. 7 is an exploded view of the motion sensor shown in FIG. 1 without the sprockets.

As shown in FIGS. 5 and 6, motor unit housing 56 includes a first housing section 56A, a second housing section 56B, and a gasket 250 between first housing section 56A and second housing section 56B. Disposed within motor unit housing 56 is a mounting bracket 254 that seats within a groove 258 formed in first housing section 56A and a groove 260 formed in second housing section 56B. A motor 262 having a drive shaft 263 is rigidly fixed to mounting bracket 254 by screws 264 and 268. Motor 262 is controlled by signals received over a communication bus 272 connected to a control unit 276 (FIG. 1) which, in turn, is attached to frame 22 through a mounting bracket 280. Motor control unit 276 further communicates with a control center (not shown, but typically mounted on the bicycle handlebars) through a communication bus 284.

A worm gear 290 is fixed to motor drive shaft 263 by a set screw 294 for driving pivot shaft 150 through a gear reduction unit 800. Gear reduction unit 800 includes a larger diameter gear 804 that meshes with worm gear 290. Large diameter gear 804 is pivotably mounted to first housing section 56A through a pivot shaft 808 seated in a recess 810 formed in first housing section 56A. A smaller diameter gear 814 is nonrotatably fixed to larger diameter gear 814 and meshes with another larger diameter gear 818. Larger diameter gear 818 is pivotably mounted to first housing section 56A through a pivot shaft 822 that seats in a recess 826 formed in first housing section 56A. A smaller diameter gear 830 is nonrotatably fixed to pivot shaft 822 and meshes with a fan gear 834 that is nonrotatably fixed to pivot shaft 150. Pivot shaft 150 extends through an opening 836 in first housing section 56A and through an opening 838 in second housing section 56B. O-ring seals 840 and 844 are disposed around pivot shaft 150 on opposite sides of fan gear 834 for preventing contaminants from entering motor unit housing 56 through openings 836 and 838. A potentiometer 870 is fitted to shaft section 150A of pivot shaft 150 to determine the rotational position of pivot shaft 150 and hence of movable member 158.

In operation, motor 262 rotates pivot shaft 150 counterclockwise through gear reduction unit 800 to cause chain guide 190 to switch chain 200 from a larger diameter sprocket 28(A–G) to a smaller diameter sprocket 28(A–G), and motor 262 rotates pivot shaft 150 clockwise through gear reduction unit 800 to cause chain guide 190 to switch chain 200 from a smaller diameter sprocket 28(A–G) to a larger diameter sprocket 28(A–G). When motor 262 rotates pivot shaft 150 counterclockwise, actuating arm 204 rotates counterclockwise and pulls upwardly on first end 214 of spring 218. If there is no significant resistance to movement of movable member 158, then actuating arm 204 remains seated on abutments 211A and 211B, and the upward movement of actuating arm 108 causes spring 218 to lift up on spacer 188. This, in turn, causes movable member 158 to move toward a smaller sprocket 28(A–G) without causing the first end 214 of spring 218 to twist around spacer 188.

However, if a large resistance is applied to the movement of movable member 158, such as when the cyclist is not pedaling, then actuating arm 204 lifts up from abutments 211A and 211B while movable member 158 remains stationary, and the upward movement of actuating arm 204 causes first spring end 214 to twist around spacer 218, thus increasing the tension on coil spring 218. Coil spring 218 thus saves the energy for the shift operation until the source of resistance to movement of movable member 158 is removed, such as when the cyclist resumes pedaling. When this resistance is removed, movable member 158 moves toward a smaller diameter sprocket 28(A–G), and abutments 211A and 211B on link members 108 and 130 rise until they contact actuating arm 204.

It should be noted that coil spring 218 also functions as a shock absorber in the event the bicycle falls over and the derailleur strikes the ground. Thus, when movable member 158 is struck from the left in FIG. 2, the movable member tends to move downward. As understood from FIG. 4, this would cause abutments 211A and 211B to move downward away from actuating arm 204, thus absorbing the shock.

When motor 262 rotates pivot shaft 150 in the clockwise direction, actuating arm 204 presses against abutments 211A and 211B, thus causing movable member 158 to move toward a larger diameter sprocket 28(A–G).

Motion sensor 18 provides information about the rotational state of the plurality of sprockets 28(A–G). This information may be used to ascertain the speed of rotation of the plurality of sprockets 28(A–G) and/or the rotational position of the plurality of sprockets 28(A–G). This information may be used to determine if and when to activate motor 262 to shift the derailleur. For example, if the plurality of sprockets 28(A–G) are not rotating, thus creating significant resistance to movement of movable member 158, it may be desirable to delay the shift operation until the cyclist resumes pedaling. Also, if the plurality of sprockets 28(A–G) include shift facilitating structures (described below) at certain locations, then it may be desirable to activate motor 262 only when the shift facilitating structures are located in a desired position relative to the derailleur guide pulley 199.

Figure 8:
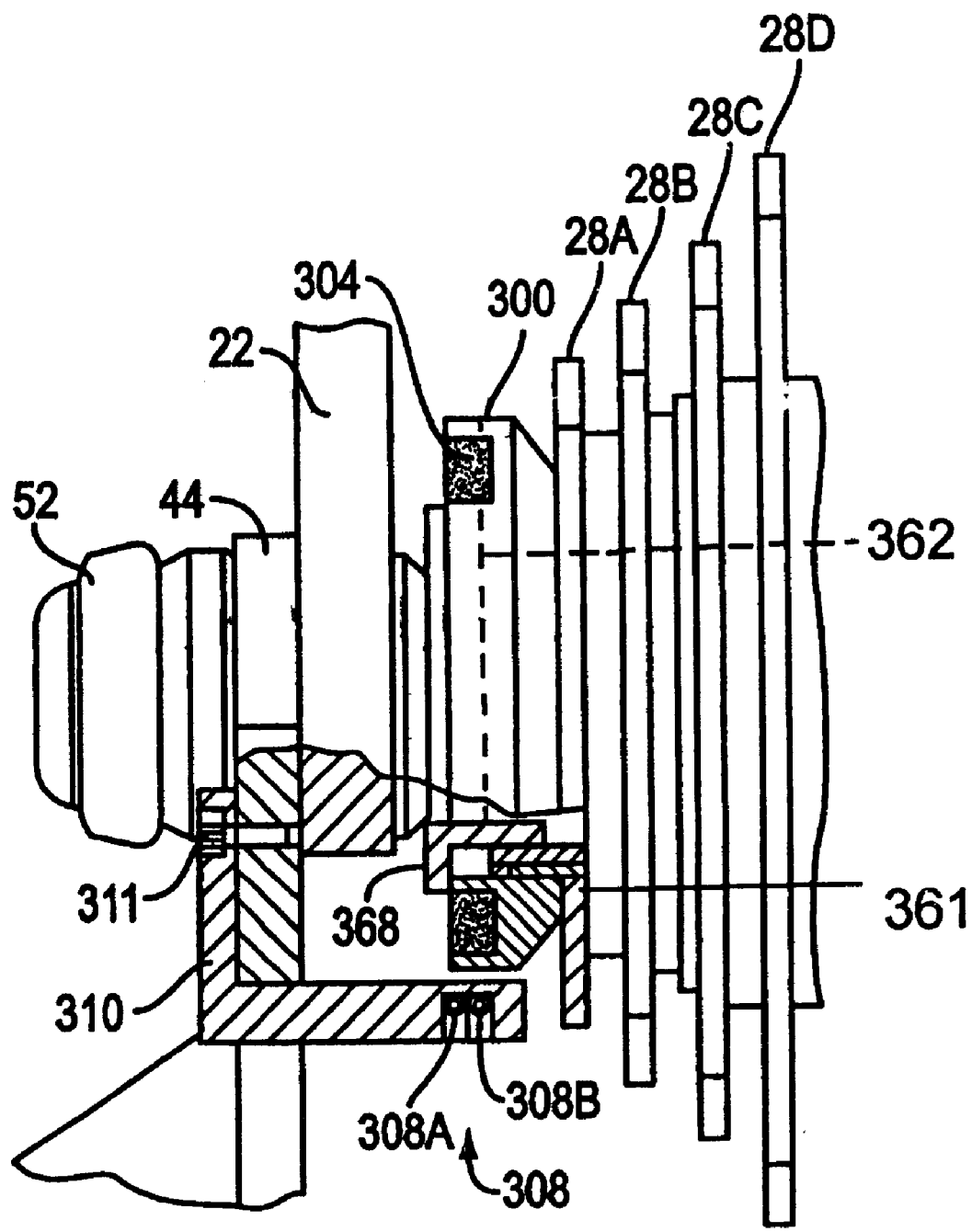
FIG. 8 is a partial cross-sectional view of the motion sensor shown in FIG. 1.

As shown in FIGS. 1, 2, 7 and 8, motion sensor 18 includes a sensor retainer 300 for mounting coaxially with the sprocket assembly 28 so that the sensor retainer 300 rotates together with the sprocket assembly 28. A plurality of first sensor elements 304 in the form of signal generating elements such as magnets are embedded within or otherwise mounted circumferentially around sensor retainer 300 for rotation with sensor retainer 300. As shown in FIG. 8, the laterally innermost sides of sensor elements 304 shown therein are disposed laterally outwardly from a laterally outermost side of the laterally outermost sprocket 28A. A second sensor element 308 is attached to base member 44 or otherwise mounted in close proximity to sensor retainer 300 so that sensor retainer 300 rotates relative to second sensor element 308. In this embodiment, second sensor element 308 includes a frame 310 attached to base member 44 through bolts 311, a first sensor unit 308A for communicating with the plurality of first sensor elements 304, and a second sensor unit 308B for communicating with the plurality of first sensor elements 304. Each sensor unit 308A and 308B comprises a signal receiving element such as a magnetic signal receiver, and first sensor unit 308A is offset from second sensor nit 308B in a circumferential direction. Thus, the direction of rotation of sprocket assembly 28 ca be determined based on which sensor unit 308A or 308B first receives the magnetic signal from each first sensor element 304. The elapsed time between receipt of the signal by first sensor unit 308A and receipt of the signal by second sensor unit 308B for a given revolution of sprocket assembly 28 provides a second source of data for the rotational speed of sprocket assembly 28 in addition to the traditional use of the elapsed time between receipt of the magnetic signal for successive revolutions of sprocket assembly 28. The received signals are communicated to control unit 276 over a communication bus 309 which structurally merges with communication bus 272 from motor 262 to form an integrated communication bus 313 (FIG. 1).

In this embodiment, sensor retainer 300 is adapted to be mounted on a freehub-style wheel hub 320. Wheel hub 320 includes a hub shell 324 and a pair of spoke flanges 328 and 330 with spoke holes 334 and 338, respectively, for receiving the wheel spokes (not shown) that mount the hub 320 to the wheel rim (not shown). A cylindrical sprocket mounting sleeve 340 is rotatably mounted around axle 32 through a one-way clutch mechanism (not shown) such that sprocket mounting sleeve 340 transmits rotational force from sprocket assembly 28 to hub shell 324 when sprocket assembly 28 rotates in one direction only. The structure and function of wheel hub 320 including sprocket mounting sleeve 340 and the one way clutch are well known, so a detailed description of these components shall be omitted.

A plurality of splines 350 are circumferentially formed on the outer peripheral surface of sprocket mounting sleeve 340 for mating with complementary splines 354 formed on the inner peripheral surface of sensor retainer 300. Similar splines (not shown) are formed on the inner peripheral surface of each of the plurality of sprockets 28(A–G). In this embodiment, a position locating spline 358 having a larger width than the other splines 354 is provided for engaging a similarly larger width position locating groove (not shown) on the sprocket mounting sleeve 340 so that sensor retainer 300 can be mounted on sprocket mounting sleeve 340 in only one rotational position. A similar position locating spline (361, FIG. 8), which functions as a sprocket positioning structure, is formed on the inner peripheral surface of each of the plurality of sprockets 28(A–G) (only the spline 361 for sprocket 28 is shown) for the same reason. Thus, not only will sensor retainer 300 and sprockets 28(A–G) be mounted on sprocket mounting sleeve 340 in only one rotational position, but the rotational position of sensor retainer 300 will be predetermined relative to sprocket assembly 28. This is very useful when the plurality of sprockets 28(A–G) have shift facilitating structures for facilitating the transfer of the chain from one sprocket to another as described more full below.

The free end of sprocket mounting sleeve 340 includes a threaded inner peripheral surface 360 for engaging a threaded outer peripheral surface 364 of a lock ring 368. Screwing lock ring 368 onto sprocket mounting sleeve 340 thus nonrotatably fixes sprocket assembly 28 and sensor retainer 300 onto hub 320. Lock ring 368 also includes a plurality of splines 370 for engaging a tool (not shown) so that lock ring 368 may be installed or removed from sprocket mounting sleeve 340 as desired.

Figure 9:
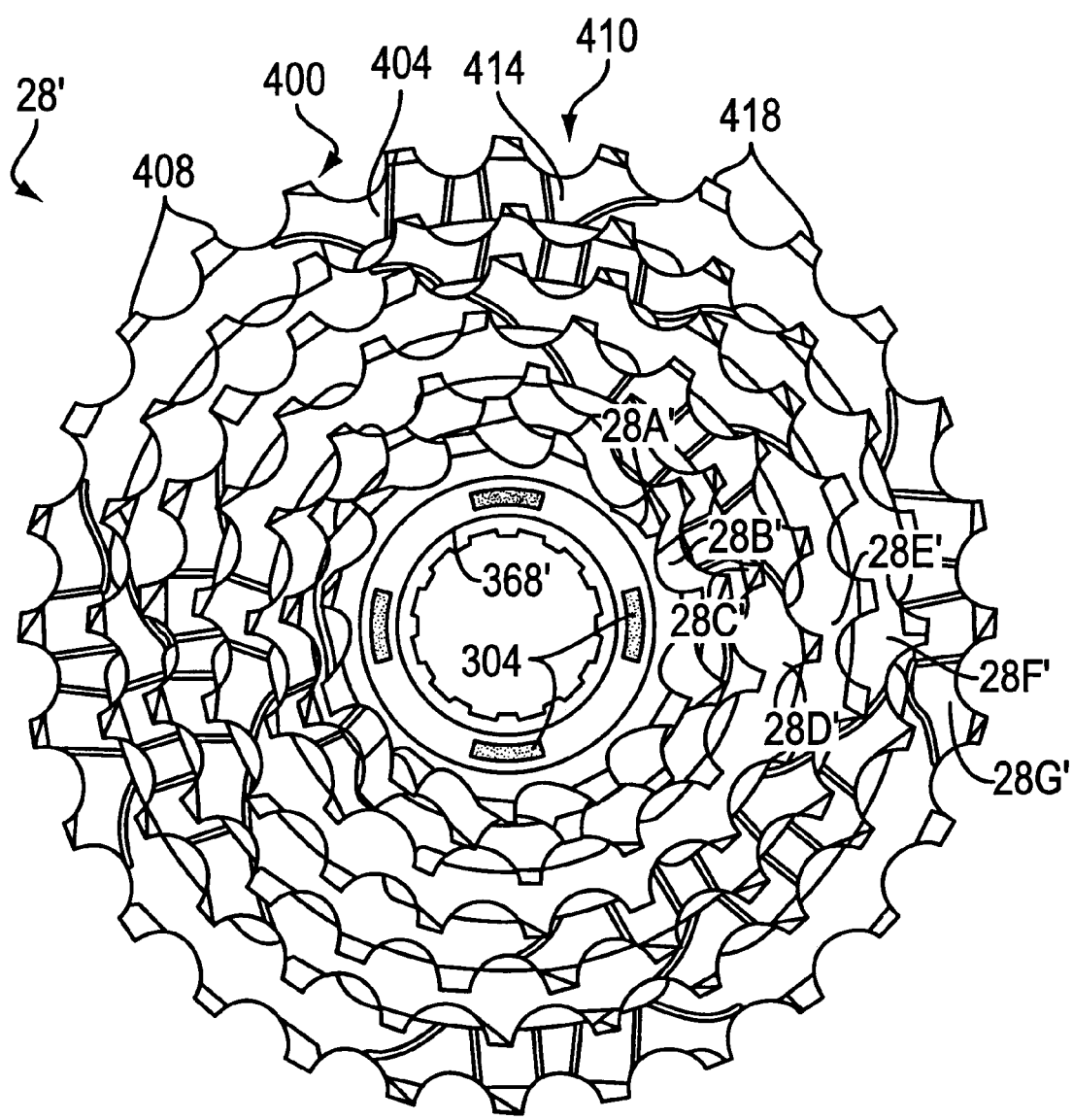
FIG. 9 is a side view of an alternative embodiment of a sprocket assembly with sensor elements fixed to a locking ring.

FIG. 9 is a side view of an alternative embodiment of a sprocket assembly 28' according to the present invention. In this embodiment, sensor retainer 300 is omitted. Instead, a lock ring 368' having the same general structure as lock ring 368 in FIG. 7 functions as the sensor retainer, wherein first sensor elements 304 are embedded within or otherwise mounted to lock ring 368'. Also, sprocket assembly 28' includes shift facilitating structures for facilitating of a chain from one sprocket to another. Using sprockets 28F' and 28G' as an example, sprocket 28G' includes a shift facilitating structure 400 in the form of a recess 404 disposed on the side of sprocket 28G' and one or more angled and/or beveled sprocket teeth 408 to facilitate transfer of the chain from sprocket 28F' to sprocket 28G'. Such structures are now well known and are described, for example, in U.S. Pat. No. 4,889,521, incorporated herein by reference. Sprocket 28G' also includes a shift facilitating structure 410 in the form of a recess 414 disposed on the side of sprocket 28G' and one or more angled and/or beveled sprocket teeth 418 to facilitate transfer of the chain from sprocket 28G' to sprocket 28F'. With such shift facilitating structures, it is desirable to activate the derailleur for shifting the chain when the guide wheel 199 is in close proximity to the shift facilitating structures. This information can be ascertained by using a motion sensor 18 according to the present invention.

Figure 10:
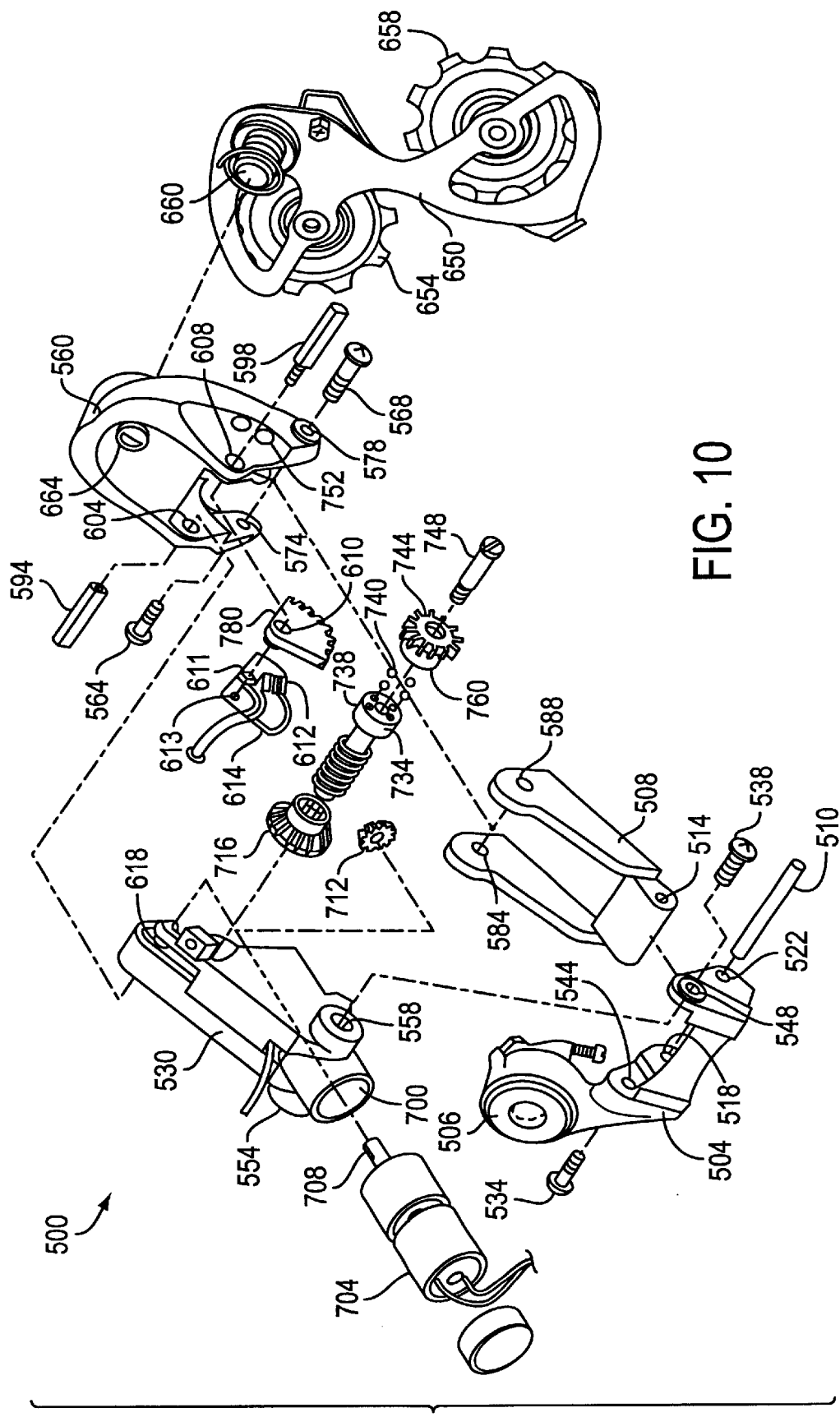
FIG. 10 is an exploded view of an alternative embodiment of a motor driven derailleur according to the present invention.

FIG. 10 is an exploded view of an alternative embodiment of a motor driven derailleur 500 according to the present invention. Whereas the motor driven derailleur shown in FIG. 1 had a motor integrally formed with the base member, in this embodiment the motor is integrally formed with one of the link members. More specifically, derailleur 500 includes a base member 504 with a mounting bolt 506 for mounting derailleur 500 to frame 22. A link member 508 is pivotably mounted to base member 504 by a pivot shaft 510 that passes through an opening 514 in link member 508 and through openings 518 and 522 in base member 504. A link member 530 is pivotably mounted to base member 504 by screws 534 and 538 that pass through respective openings 544 and 548 in base member 504 and into respective threaded openings 554 and 558 in link member 530. A movable member 560 is pivotably coupled to the other end of link member 508 by screws 564 and 568 that through respective openings 574 and 578 and into respective threaded openings 584 and 588 in link member 508. Movable member 560 also is pivotably coupled to the other end of link member 530 by a tubular nut 594 that passes through an opening 604 in movable member 560 and through an opening 618 in link member 530. A tubular screw 598 passes through an opening 608 in movable member 560, through an opening 610 in a fan gear 780, through an opening 611 in an electrical brush member 612, through an opening 613 in a resistance contact member 614, and threads into tubular nut 594. Movable member 560, tubular nut 594, tubular screw 598, fan gear 780 and electrical brush member 612 rotate together relative to link member 530, whereas resistance contact member 614 remains stationary. A chain guide 650 having a guide pulley 654 and a tension pulley 658 is pivotably mounted to movable member 560 in a conventional way by a threaded shaft 660 screwing into a threaded opening 664 in movable member 560.

Figure 11:
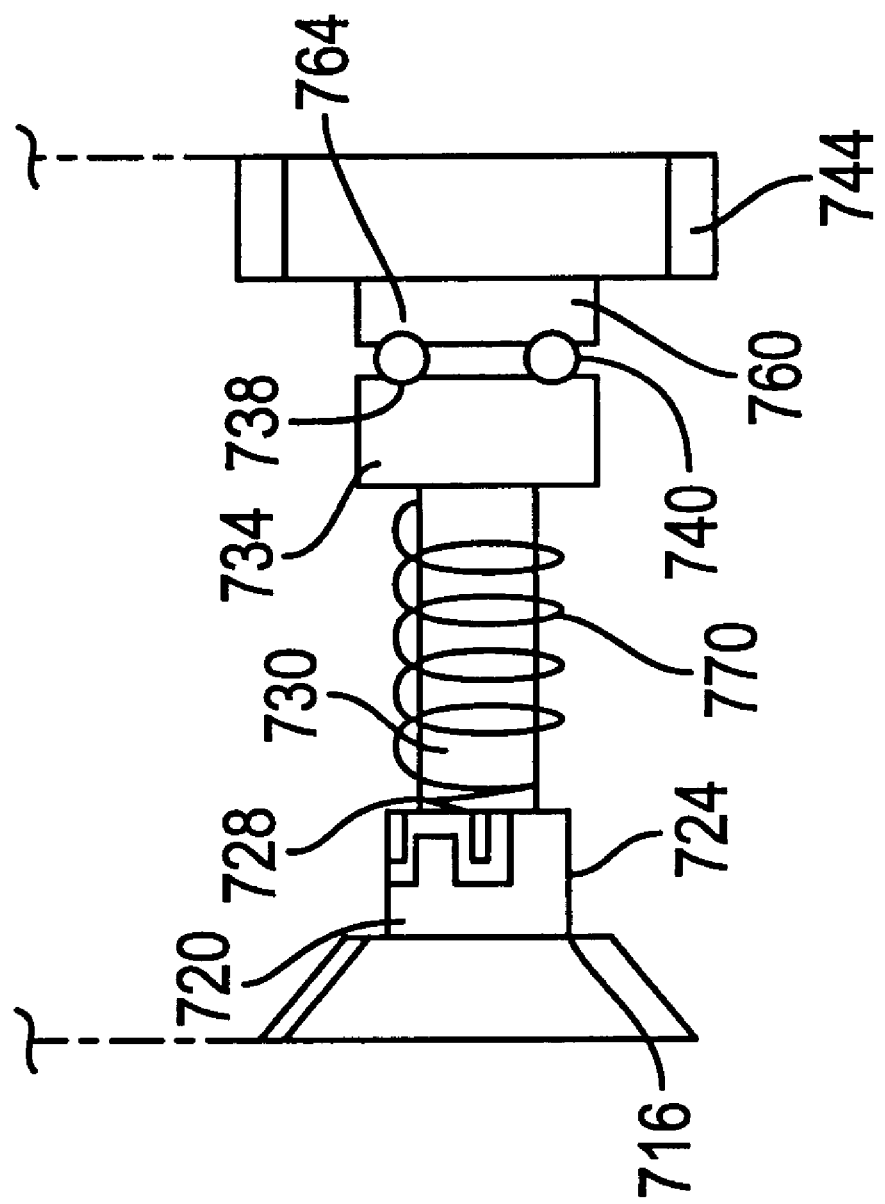
FIG. 11 is an assembled view of a clutch assembly used in the derailleur shown in FIG. 10.

In this embodiment, link member 530 includes a cylindrical bore 700 into which is fitted a motor 704 having a drive shaft 708. A drive gear 712 is nonrotatably mounted to drive shaft 708 for meshing with a bevel gear 716. As shown in FIG. 11, bevel gear 716 has a coupling shaft 720 with splines 724 that engage complementary splines 728 on one end of an intermediate shaft 730 such that intermediate shaft 730 cannot rotate relative to coupling shaft 720, but intermediate shaft 730 can move a certain distance axially relative to coupling shaft 720. The other end of intermediate shaft 730 is nonrotatably coupled to a first clutch disk 734 having a plurality of hemispherical recesses 738 formed on the side facing away from bevel gear 716. A plurality of balls 740 are fitted within hemispherical recesses 738. An intermediate gear 744 that meshes with fan gear 780 is pivotally coupled to movable member by a screw 748 that passes through an opening 752 in movable member 560 and into a threaded opening in intermediate gear 744. A second clutch disk 760 is nonrotatably mounted to intermediate gear 744, wherein second clutch disk 760 includes a plurality of hemispherical recesses for seating the plurality of balls 740.

Figure 12:
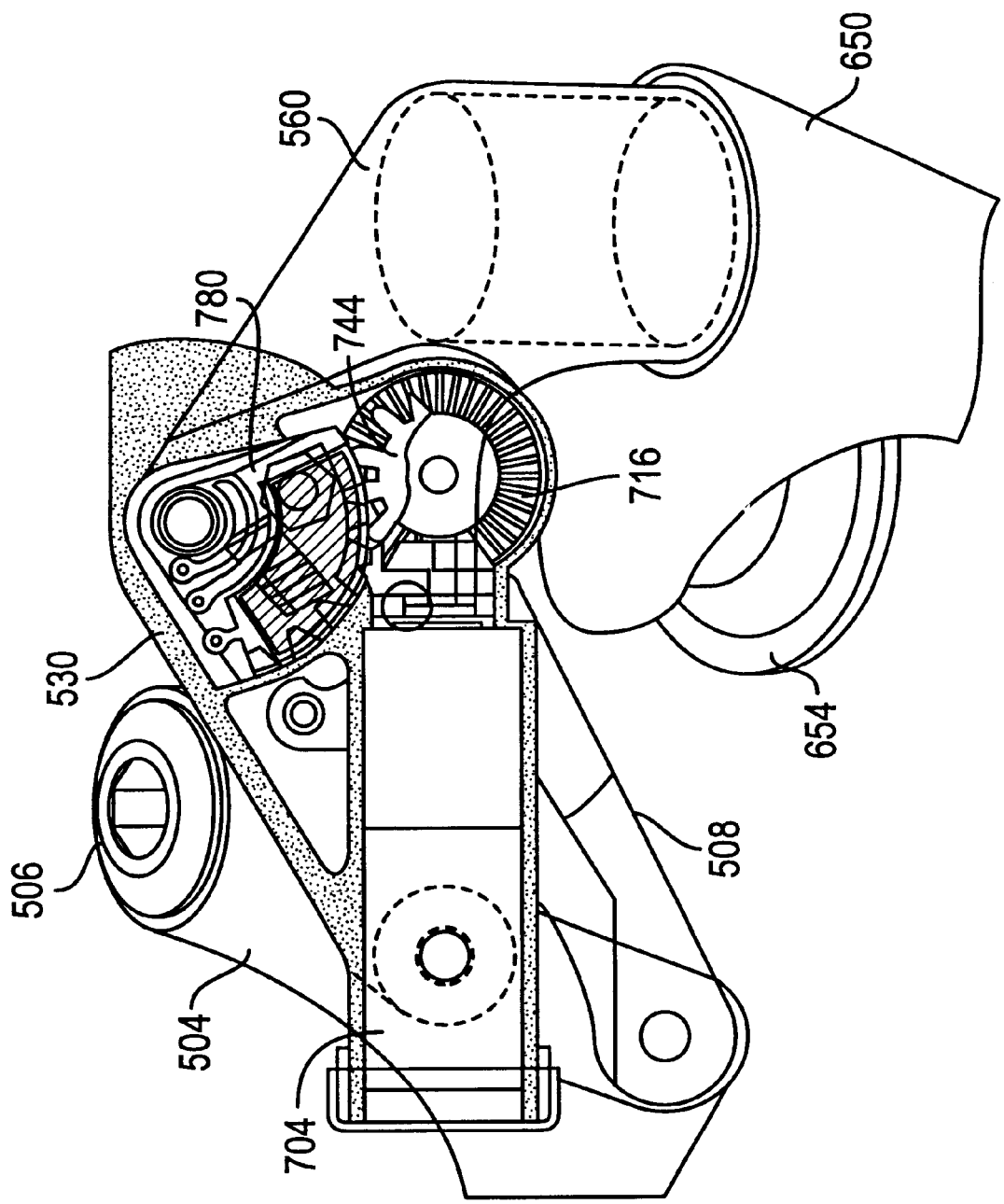
FIG. 12 is a partial cutaway view of the assembled motor driven derailleur shown in FIG. 10 in an initial position.
Figure 13:
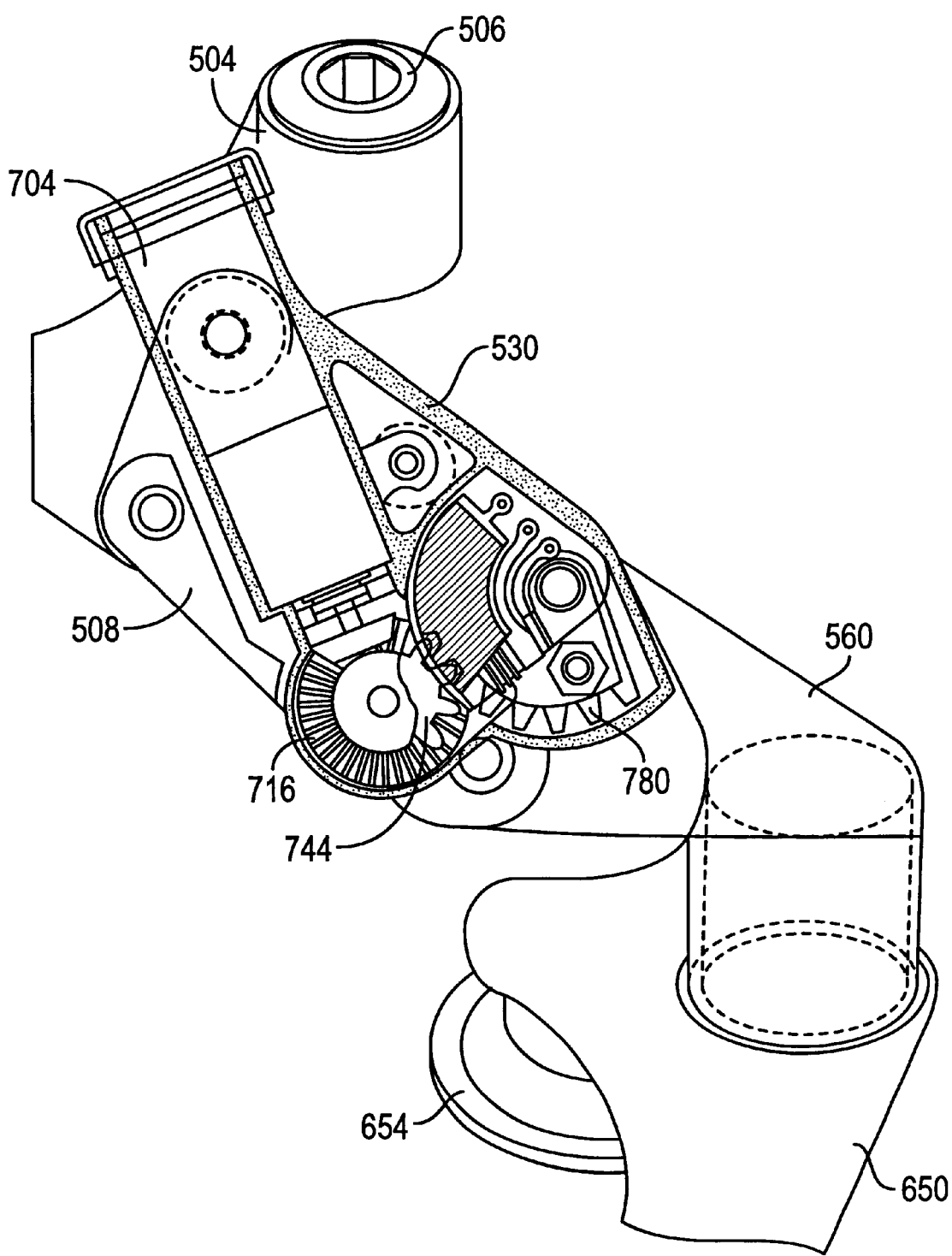
FIG. 13 is a partial cutaway view of the assembled motor driven derailleur shown in FIG. 10 in an extended position.

First clutch disk 734 is biased against second clutch disk 760 by a spring 770 such that balls 740 are seated in recesses 738 and 764 in a detenting relationship. Thus, bevel gear 716 and intermediate gear ordinarily rotate together as a unit unless substantial resistance is applied to intermediate gear 744. When substantial resistance is applied to intermediate gear 744, rotation of bevel gear 716 causes balls 740 to leave recesses 738 and/or 764, thus pushing intermediate shaft 730 to the left in FIG. 11 and allowing relative rotation between bevel gear 716 and intermediate gear 744. When the substantial resistance to intermediate gear 744 is removed, balls 740 re-engage recesses 738 and 764, and intermediate gear 744 continues integral rotation with bevel gear 716. Thus, rotation of drive shaft 708 causes fan gear 780 to move movable member 560 relative to link members 508 and 530 as shown in FIGS. 12 and 13. The position of movable member 560 relative to link members 508 and 530 may be ascertained by the cooperation of electrical brush member 612 and resistance contact member 614, which form a potentiometer.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s).

Although sprocket retainer 300 was formed as an annular member, sprocket retainer 300 could be any shape and need not be formed as a closed circle or polygon. Sprocket retainer 300 may have a threaded inner peripheral surface 362 as shown in broken lines in FIG. 8 rather than a splined surface. The sensor elements 304 need not have a uniform circumferential spacing, and some applications may require only one sensor element 304. Sensor elements 308A and 308B may be disposed directly on base member 44. The chain shift facilitating structures 400 and 410 shown in FIG. 9 may be incorporated into the embodiment shown in FIG. 1, or they may be omitted. Thus, the scope of the invention should not be limited by the specific structures disclosed or the apparent initial focus on a particular structure or feature.

What is claimed is:

1. A sprocket assembly for a bicycle comprising:
   a sprocket mounting sleeve adapted to be rotatably supported relative to an axle;
   a plurality of sprockets coax ally mounted together on the sprocket mounting sleeve for rotation relative to the axle;
   a sensor element mounted to the sprocket mounting sleeve for integral rotation with the plurality of sprockets; and
   wherein a laterally innermost side of the sensor element is disposed laterally outwardly from a laterally outermost side of the late ally outermost sprocket.

2. The sprocket assembly according to claim 1 wherein the sensor element comprises a magnet.

3. The sprocket assembly according to claim 1 further comprising a plurality of the sensor elements mounted on the sprocket mounting sleeve for integral rotation with the plurality sprockets.

4. The sprocket assembly according to claim 3 wherein each of the plurality of sensor elements comprises a magnet.

5. The sprocket assembly according to claim 1 further comprising an annular member coaxially mounted on the sprocket mounting sleeve for integral rotation with the plurality of sprockets, wherein the sensor element is mounted to the annular member for rotation with the annular member.

6. The sprocket assembly according to claim 5 wherein the sensor element is embedded in the annular member.

7. The sprocket assembly according to claim 5 wherein the annular member includes a plurality of splines on an inner peripheral surface thereof.

8. The sprocket assembly according to claim 5 wherein the annular member includes a threaded inner peripheral surface.

9. The sprocket assembly according to claim 5 wherein the sprocket mounting sleeve has a plurality of mounting sleeve splines disposed on an outer peripheral surface thereof, wherein the plurality of sprockets have a plurality of sprocket splines disposed on an inner surface thereof, wherein the annular member has a plurality of annular member splines disposed on an inner peripheral surface thereof, and wherein the plurality of mounting sleeve splines engage the plurality of sprocket splines and the plurality of annular member splines.

10. The sprocket assembly according to claim 1 wherein the plurality of sprockets includes a first sprocket d a second sprocket, wherein the first sprocket includes a shift facilitating structure for facilitating shifting of a chain from the second sprocket to the first sprocket, and wherein the sensor element an the first sprocket are structured to be located relative to each other at a predetermined subset of rotational positions less than all of the possible rotational positions of the sensor element relative to the first sprocket, and to prevent the sensor element and the first sprocket to be located at relative rotational positions other than the predetermined subset of rotational positions.

11. The sprocket assembly according to claim 10 wherein the shift facilitating structure includes a recess disposed on a side of the first sprocket.

12. The sprocket assembly according to claim 1 wherein the first sprocket includes a sprocket positioning structure on an inner peripheral surface thereof, wherein the sensor element is coupled to a sensor retainer, wherein the sensor retainer includes a retainer positioning structure on an inner peripheral surface thereof, and wherein the sprocket positioning structure and the retainer positioning structure position the sensor retainer at the predetermined subset of rotational positions relative to the first sprocket.

13. The sprocket assembly according to claim 1 wherein the sprocket mounting sleeve has a plurality of mounting sleeve splines disposed on an outer peripheral surface thereof wherein the plurality of sprockets have a plurality of sprocket splines disposed on an inner surface thereof, and wherein the plurality of mounting sleeve splines engage the plurality of sprocket splines.

14. A sprocket assembly for a bicycle comprising:
a plurality of sprockets mounted together for rotation around a common axis;
an annular member having sensor element, wherein the annular member is coaxially mounted with the plurality of sprockets for integral rotation with the plurality of sprockets;
wherein a laterally innermost side of the sensor element is disposed laterally outwardly from a laterally outermost side of the laterally outermost sprocket; and
wherein the annular member includes a plurality of splines on an inner peripheral surface thereof.

15. A bicycle sprocket assembly comprising:
a plurality of sprockets mounted together for rotation around a common axis;
an annular member having sensor element, wherein the annular member is coaxially mounted with the plurality of sprockets for integral rotation with the plurality of sprockets;
wherein a laterally innermost side of the sensor element is disposed laterally outwardly from a laterally outermost side of the late ally outermost sprocket; and
wherein the annular member includes a threaded inner peripheral surface.

16. A sprocket assembly for a bicycle comprising:
a plurality of sprockets mounted together for rotation around a common axis, wherein the plurality of sprockets includes a firs sprocket and a second sprocket, and wherein the first sprocket includes a shift facilitating structure for facilitating shifting of a chain from the second sprocket to the first sprocket;
a sensor element coupled for rotation with the plurality of sprockets; and
wherein the sensor element and the first sprocket are structured to be located relative to each other at a predetermined subset of rotational positions less than all of the possible rotational positions of the sensor element relative to the first sprocket, and to prevent the sensor element and the first sprocket to be located at relative rotational positions other than the predetermined subset of rotational positions.

17. The sprocket assembly according to claim 16 wherein the shift facilitating structure includes a recess dispose on a side of the first sprocket.

18. The sprocket assembly according to claim 16 wherein the first sprocket includes a first sprocket positioning structure on an inner peripheral surface thereof, wherein the sensor element is coupled to a sensor retainer, wherein the sensor retainer includes a retainer positioning structure on an inner peripheral surface thereof, and wherein the sprocket positioning structure and the retainer positioning structure position the sensor element at the predetermined subset of rotational positions relative to the first sprocket.

19. The sprocket assembly according to claim 18 wherein a laterally innermost side of the sensor element is disposed laterally outwardly from a laterally outermost side of the laterally outermost sprocket.

20. The sprocket assembly according to claim 18 further comprising an annular member coaxially mounted with the plurality of sprockets for integral rotation with the plurality of sprockets, wherein the sensor element is mounted to the annular member.

21. A bicycle sprocket assembly comprising:
a sprocket mounting sleeve adapted to be rotatably supported relative to an axle;
a plurality of sprockets coaxially mounted together on the sprocket mounting sleeve for rotation relative to the axle;
a sensor retainer mounted to the sprocket mounting sleeve for rotating integrally with the sprocket mounting sleeve;
a sensor element mounted to the sensor retainer for rotation therewith; and
wherein the sensor retainer is structured to mount to the sprocket mounting sleeve so that the sensor retainer may be removed from the sprocket mounting sleeve while leaving the plurality of sprockets on the sprocket mounting sleeve.

22. The sprocket assembly according to claim 21 wherein the sensor element comprises a magnet.

23. The sprocket assembly according to claim 21 further comprising a plurality of the sensor elements mounted to the sensor retainer for rotation therewith.

24. The sprocket assembly according to claim 23 wherein each of the plurality of elements comprises a magnet.

25. The sprocket assembly according to claim 21 wherein the sensor retainer comprises an annular member that rotates integrally with the sprocket mounting sleeve, wherein the sensor element is mounted to the annular member.

26. The sprocket assembly according to claim 25 wherein the sensor element is embedded in the annular member.

27. The sprocket assembly according to claim 25 wherein the annular member includes a plurality of splines on a inner peripheral surface thereof.

28. The sprocket assembly according to claim 25 wherein the annular member includes a threaded inner peripheral surface.

29. The sprocket assembly according to claim 25 wherein the sprocket mounting sleeve has a plurality of mounting sleeve splines disposed on an outer peripheral surface thereof, wherein the plurality of sprockets have a plurality of sprocket splines disposed on an inner surface thereof, wherein the annular member has a plurality of annular member splines disposed on an inner peripheral surface thereof, and wherein the plurality of mounting sleeve splines engage the plurality of sprocket splines and the plurality of annular member splines.

30. The sprocket assembly according to claim 21 wherein the plurality of sprockets includes a first sprocket and a second sprocket, wherein the first sprocket includes a shift facilitating structure for facilitating shifting of a chain from the second sprocket to the first sprocket, and wherein the sensor retainer and the first sprocket are structured to be located relative to each other at a predetermined subset of rotational positions less than all of the possible rotational positions of the sensor retainer relative to the first sprocket, and to prevent the sensor retainer and the first sprocket to be located at relative rotational positions other than the predetermined subset of rotational positions.

31. The sprocket assembly according to claim 30 wherein the shift facilitating structure includes a recess dispose on a side of the first sprocket.

32. The sprocket assembly according to claim 30 wherein the first sprocket includes a sprocket positioning structure on inner peripheral surface thereof, wherein the sensor retainer includes a retainer positioning structure on an inner peripheral surface thereof, and wherein the sprocket positioning structure and he retainer positioning structure position the sensor retainer at the predetermined subset of rotational positions relative to the first sprocket.

33. The sprocket assembly according to claim 21 wherein the sprocket mounting sleeve has a plurality of mounting sleeve splines disposed on an outer peripheral surface thereof, wherein the plurality of sprockets have a plurality of sprocket splines disposed on an inner surface thereof, and wherein the plurality f mounting sleeve splines engage the plurality of sprocket splines.

34. The sprocket assembly according to claim 21 wherein the sensor retainer and the plurality of sprockets are structure to be located relative to each other at a predetermined subset of rotational positions less than all of he possible rotational positions of the sensor retainer relative to the plurality of sprockets, and to prevent the sensor retainer and the plurality of sprockets to be located at relative rotational positions other than the predetermined subset of rotational positions.

35. The sprocket assembly according to claim 21 wherein the sensor retainer is mounted to the sprocket mounting sleeve such that the sensor retainer is incapable of rotational movement relative to the sprocket mounting sleeve.

36. The sprocket assembly according to claim 21 wherein the sensor element is disposed laterally outwardly from e plurality of sprockets.

37. The sprocket assembly according to claim 21 wherein the sprocket mounting sleeve comprises a tubular member.

38. A bicycle sprocket assembly comprising:
a wheel hub comprising a hub shell and a pair of spoke flanges, wherein each spoke flange has a plurality of spoke holes for receiving a corresponding plurality of wheel spokes that mount the hub shell to a wheel rim, and wherein the hub shell is rotatably supported on an axle;
a sprocket mounting sleeve adapted to be rotatably relative to the axle;
a plurality of sprockets coaxially mounted together on the sprocket mounting sleeve for rotation relative to the axle, wherein the sprocket mounting sleeve transmits rotational force from the plurality of sprockets to the hub shell;
a sensor retainer mounted t the sprocket mounting sleeve for rotating integrally with the sprocket mounting sleeve; and
a sensor element mounted to the sensor retainer for rotation the therewith.

39. The sprocket assembly according to claim 38 wherein the sensor retainer and the plurality of sprockets are structure to be located relative to each other at a predetermined subset of rotational positions less than all of the possible rotational positions of the sensor retainer relative to the plurality of sprockets, and to prevent the sensor retainer and the plurality of sprockets to be located at relative rotational positions other than the predetermined subset of rotational positions.

40. The sprocket assembly according to claim 39 wherein the sensor retainer comprises an annular member coaxially mounted with the plurality of sprockets for integral rotation with the plurality of sprockets.

41. The sprocket assembly according to claim 40 wherein the sprocket mounting sleeve has a plurality of mounting sleeve splines disposed on an outer peripheral surface thereof, wherein the plurality of sprockets have a plurality of sprocket splines disposed on an inner surface thereof, wherein the annular member has a plurality of annular member splines disposed on an inner peripheral surface thereof, and wherein the plurality of mounting sleeve splines engage the plurality of sprocket splines and the plurality of annular member splines.

* * * * *